July 3, 1956
B. J. SMITH ET AL
2,753,202
LOCK MECHANISM
Filed Jan. 11, 1955
2 Sheets-Sheet 1
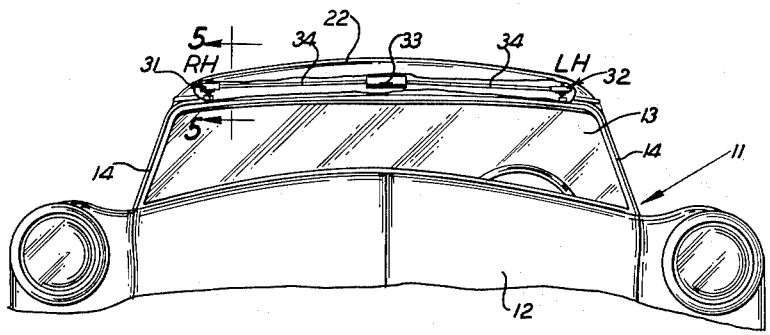
FIG. 1
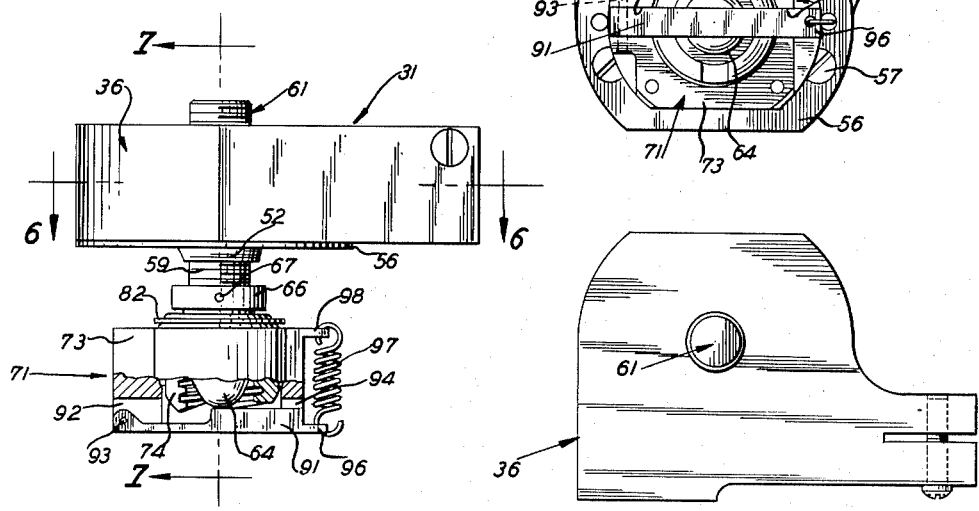
FIG. 3
FIG. 2
FIG. 4
B. J. SMITH
R. T. BUTLER
INVENTORS
BY E. C. McRae
J. R. Faulkner
J. H. Oster
ATTORNEYS July 3, 1956
B. J. SMITH ET AL
2,753,202
LOCK MECHANISM
Filed Jan. 11, 1955
2 Sheets-Sheet 2
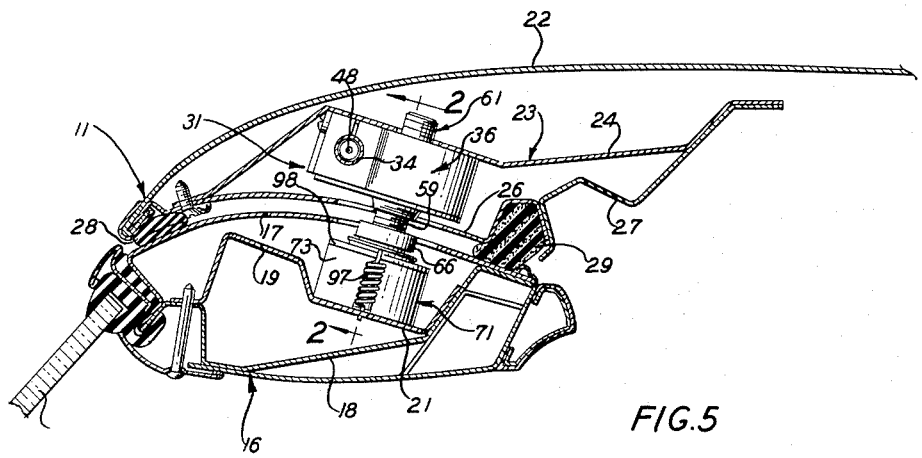
FIG.5
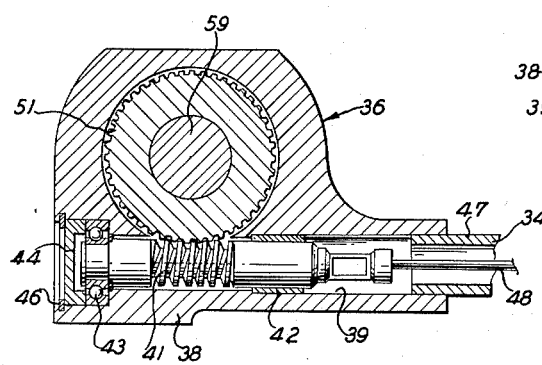
FIG.6
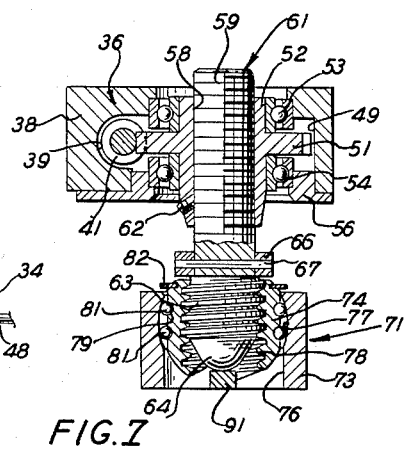
FIG.7
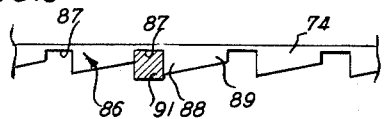
FIG. 9
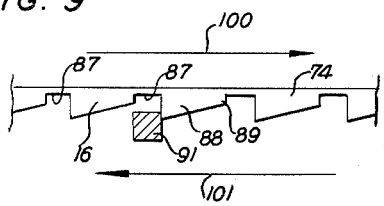
FIG. 10
FIG.8
B.J. SMITH
R.T. BUTLER
INVENTORS
BY E.C. McRae
J.R. Faulkner
J.H. Oster
ATTORNEYS

United States Patent Office 2,753,202
Patented July 3, 1956

2,753,202
LOCK MECHANISM

Ben J. Smith and Roy T. Butler, Detroit, Mich., assignors to Ford Motor Company, Dearborn, Mich., a corporation of Delaware Application January 11, 1955, Serial No. 481,157

9 Claims. (Cl. 292—251)

This invention relates generally to lock mechanisms, and has particular reference to lock mechanisms to be used in connection with a closure member of a motor vehicle.

The invention is shown herein as applied to a header lock for the retractable hard top of a motor vehicle, but may also be applied to lock mechanisms for luggage compartment lids, hoods, and other closure members of motor vehicles. In convertibles a pair of header locks are used, one at each side of the forward portion of the vehicle top, and in the present instance each lock comprises a vertically mounted header screw carried by the top and driven by a common electric motor, each screw engageable with a nut mounted upon the windshield header. The header lock nut is rotatably mounted in a housing and has a ratchet portion engageable with a pawl carried by the housing to normally hold the nut against rotation, thus permitting threaded engagement between the header screw and the nut. When the screw has traveled downwardly a predetermined amount sufficient to draw the adjacent portion of the vehicle top downwardly to its closed position the screw automatically disengages the pawl from the ratchet portion of the nut, thereafter permitting the nut to rotate with the screw in the housing. This arrangement not only accurately positions the top in its closed position, but also insures proper closing of both sides of the vehicle top even though one header lock mechanism may engage its respective nut earlier than the other and hence complete its closing movement first. The header locks may be released simply by reversing the electric motor, the ratchet arrangement preventing rotation between the nut and the housing and allowing the header screw to be withdrawn from the nut. The header nut is mounted in its housing for limited angular movement to provide a self aligning feature compensating for slight variations and misalignments. The header lock is compact in size, positive in operation, self-aligning, and has other automatic features to provide trouble free operation.

Other objects and advantages of this invention will be made more apparent as this description proceeds, particularly when considered in connection with the accompanying drawings, wherein:

Figure 1 is a fragmentary front elevational view of a motor vehicle, partly broken away to show the header locks at opposite sides thereof and the electric motor drive therefor.

Figure 2 is an enlarged front elevational view of the right hand header lock of Figure 1, partly broken away and in section.

Figure 3 is a bottom plan view of the header lock shown in Figure 2.

Figure 4 is a top plan view of the header lock shown in Figure 2.

Figure 5 is an enlarged vertical cross sectional view taken on the line 5—5 of Figure 1.

Figure 6 is a horizontal cross sectional view taken on the line 6—6 of Figure 2.

Figure 7 is a vertical cross sectional view taken on the line 7—7 of Figure 2.

Figure 8 is an elevational view of the header lock nut.

Figure 9 is a developed view of the ratchet portion of the header lock nut shown in Figure 8, with the pawl in engagement therewith.

Figure 10 is a view similar to Figure 9 but showing the pawl in released position.

Referring now to the drawings, it will be seen that the present invention is shown as applied to a header lock for a vehicle having a retractable hard top. The header lock may, however, be applied to the more conventional soft top convertible type of motor vehicle, and may also be used with other closure members such as vehicle hoods and luggage compartment lids.

Referring first to Figures 1 and 5 of the drawings, the reference character 11 refers generally to a motor vehicle body having a hood 12, windshield 13 and side windshield pillars 14. Extending across the forward portion of the vehicle adjacent the upper edge of the windshield 13 is a windshield header 16 having upper and lower flanges 17 and 18 forming a generally box section header. An intermediate flange 19 is located between the upper and lower flanges 17 and 18, being suitably secured to the lower flange 18. The intermediate flange 19 has a downwardly offset portion 21.

The retractable rigid roof of the vehicle has a roof panel 22 and a roof header 23, the latter comprising upper, lower and rearward flanges 24, 26, and 27 respectively, suitably secured together. Front and rear weather strips 28 and 29 are carried by the roof header 23 for engagement with the windshield header 16 to form a weather tight seal therebetween when the roof is in its lowered or closed position.

The roof header 24 supports a right hand header lock 31 and a left hand header lock 32 at opposite sides thereof, and an electric motor 33 located generally centrally of the header. The electric motor 33 is arranged to drive each of the header locks by means of flexible cable assemblies 34. Except for being symmetrically opposite, the right hand and left hand header locks 31 and 32 are identical, and consequently only the right hand header lock 31 will be described in detail.

The header lock 31 has a housing 36 secured to the upper flange 24 of the roof header 23 by means of mounting screws (not shown). As best seen in Figure 6, the housing 36 is formed with a boss 38 having a longitudinal bore 39 formed therein. Worm 41 is journaled in the longitudinal bore 39 by means of a bushing 42 and a ball bearing 43, and is held in place by means of a spacer 44 and retaining ring 46. The open end of the bore 39 in the housing supports the casing 47 of the flexible cable 34, and the core 48 of the cable is secured to the adjacent end of the worm to drive the latter from the electric motor 33.

As best seen in Figure 7, the header lock housing 36 has a vertical bore 49 receiving a worm wheel 51, the hub 52 of which is journaled by means of ball bearings 53 and 54 in the housing 36 and in the housing cover 56 respectively, the latter being secured to the housing by means of screws 57. The hub 52 of the worm wheel 51 is formed with a threaded bore 58 adjustably receiving the threaded shank 59 of the header screw 61. A set screw 62 secures the header screw and worm wheel together in adjusted position, the header screw being provided with a flat side for engagement by the set screw.

The lower end of the header screw 61 is formed with an enlarged head 63 provided with acme type threads on its periphery. A spherical nose portion 64 is formed at the lower end of the head of the header screw 61. A collar 66 is secured by means of a pin 67 to the shank 59 of the header screw 61 adjacent the head of the screw, for a purpose to be described more in detail hereinafter.

The head 63 of the header screw 61 is adapted to be received within a nut assembly 71 secured to the intermediate flange 19 of the windshield pillar 16 by means of mounting screws (not shown). The nut assembly 71 is mounted upon the depressed portion 21 of the intermediate flange 19 and comprises a nut cage 73 and a ratchet nut 74. The nut cage 73 is formed with a bore 76, the upper portion 77 of which is spherically shaped.

The ratchet nut 74 has an internally threaded bore 78 provided with acme type threads corresponding to the threads on the head 63 of the header screw, and is provided on its outer periphery with a pair of grooves 79 adapted to receive ball bearings 81 engageable with the spherical socket 77 of the nut cage 73. The balls 81 may be inserted into the grooves 79 by rotating the ratchet nut 74 within the nut cage 73. After the insertion of the balls a retaining ring 82 is snapped into a groove 83 adjacent the upper end of the ratchet nut 74 to limit the turning movement of the nut and to hold the nut in a generally vertical position for engagement by the header screw 61. It will be apparent that the tapered nose portion 64 of the header screw 61 cooperates with the ratchet nut 74 and its mounting in the spherical socket 77 to provide a self-aligning construction insuring proper meshing of the threads on the header screw head with the threads in the ratchet nut even though slight misalignments may exist. For example, the construction accommodates uneven operation of the two header locks 31 and 42, so that no binding will occur even though one of the header locks is operated prior to the other.

The lower end of the ratchet nut 74 is formed with four arcuate peripheral ratchet teeth 86 spaced from each other to form notches 87 therebetween. The teeth 86 are shown diagrammatically in developed fashion in Figure 9, and it will be noted that each tooth is in the form of an inclined ramp having a high end 88 and a low end 89.

A pawl 91 is provided for engagement with the grooves 87 between the ratchet teeth on the ratchet nut 74 to hold the nut against rotation relative to the nut cage 73. The pawl 91 is in the form of a bar having one end received within a groove 92 in the nut cage 73 and pivotally connected thereto by means of a pivot pin 93. The opposite end of the pawl 91 is guided within a groove 94 formed in the opposite side of the nut cage 73 and is provided with an extending flange 96 engaged by one end of a coil spring 97. The opposite end of the coil spring 97 is connected to a flange 98 extending from the opposite side of the nut cage 73. The spring 97 continually urges the pawl 91 into engagement with the end of the ratchet nut 74.

Referring now to the diagrammatic view shown in Figures 9 and 10 it will be seen that in Figure 9 the pawl 91 is seated within one of the grooves 87 formed in the ratchet nut 74 between adjacent ratchet teeth 86. As a result of this engagement the ratchet nut 74 is locked against rotation within the nut cage 73 about a vertical axis, although slight rocking movement is permitted within the spherical socket 74 to accommodate misalignments. This is the position the parts occupy when the top is retracted.

The raising of the vehicle top is effected by conventional power means, and moves the top to a position wherein the header screws 61 of the two header locks 31 and 32 are located generally in vertical alignment above the nut assemblies 71 carried by the windshield header. At this time the electric motor is energized to rotate the header screws 61 of both header locks through the flexible cable drives 54, worms 41 and worm wheels 51. Actuation of the motor may be effected by manual operation of a switch or by automatic controls of any conventional type such as a limit switch positioned to be operated when the top is ready to be locked in place.

It will be apparent that rotation of the header screws 61 effects a threaded engagement between the enlarged head 63 of each header screw and the threaded bore 78 of the adjacent ratchet nut 74, the latter being held against rotation by means of the pawl 91. As previously mentioned, the mounting of the ratchet nut and the formation of the header screw are such as to provide a self-aligning feature insuring proper operation on the header locks even though the parts may be somewhat misaligned and even though one header lock may commence its threaded engagement prior to the similar engagement of the other lock.

The roof panel 22 and the roof header 23 are thus pulled downwardly into engagement with the windshield header as the header locks are operated. Referring particularly to Figures 2 and 7, it will be seen that the tapered nose 64 of the head 63 of the header screw 61 engages the pawl 91 after a predetermined downward movement. Continued downward movement then swings the pawl 91 about its pivotal mounting 93, against the action of return spring 97, until the pawl 91 is moved downwardly sufficiently to clear the lower end 89 of the adjacent ratchet tooth 86 on the ratchet nut 74. This position of the pawl is illustrated in Figure 10, and it will be seen that at this time the ratchet nut 74 is free to rotate in the direction of the arrow 100, this being the direction of rotation of the header screw 61. With the ratchet nut 74 no longer being held by the pawl 91, it rotates freely within the nut cage 73 on the ball bearings 81. The friction between the head 63 of the header screw and the ratchet nut is of course greater than the friction afforded by the ball bearings 81, and consequently the ratchet nut rotates with the header screw. As this rotation continues the pawl 91 rides successively over the inclined ramps formed on the ratchet teeth 86. This ratchet effect permits one header lock to idle while the downward movement of the other header lock is being completed in the event one lock commences its operation prior to the other. The electric motor driving the header locks may be stopped manually or may be automatically stopped by suitable conventional limit switches.

To release the header locks 31 and 32 and permit the top to be retracted, it is only necessary to reverse the rotation of the motor 33, hence driving the header screws 61 in the opposite direction. This reverse direction of rotation of the header screw is shown by the arrow 101 in Figure 10. In this direction of rotation it will be seen that the high end 88 of the adjacent ratchet tooth on the ratchet nut 74 abuts the pawl 91, locking the nut against rotation within its cage 73 and effecting a relative rotation between the ratchet nut and the header screw. As the header screw is thus retracted from the nut, the spring 97 returns the pawl 91 to the bottom of its groove 87, in position for engagement by the header screw during the next cycle of operation.

The collar 66, previously described as being pinned to the shank of the header screw 61, is positioned on the header screw in such manner as to provide a slight clearance between the collar and the adjacent end of the ratchet nut 74 when the downward movement of the header screw has been completed and the pawl 91 moved to a position permitting ratcheting of the nut. In the event of malfunctioning of the ratchet nut 74 in such manner as to prevent its rotation with the spherical socket 77 of the nut cage, continued downward movement of the header screw will be limited by engagement of the collar 66 of the adjacent end of the nut. This engagement is effected prior to movement of the pawl 91 beyond the high end 88 of the adjacent ratchet tooth, thus preventing complete disengagement of the pawl from the adjacent groove 87. Were the pawl to move beyond the high end 88 of the adjacent tooth the header lock would not function in reverse and could not be disengaged, and will therefore be seen that the collar 66 forms a protective feature The ratchet nut 74 is shown with a peripheral series of four teeth 86, but it will be understood that any number of teeth, one or more, can be provided on the nut. The ratchet nut may also be mounted for rotation within its cage by means of a plain bearing or other suitable means in the event the self-aligning feature shown is not needed or desired. In addition, it is obvious that the header lock may be reversed with the housing mounted upon the windshield header and the nut assembly upon the roof header. The header lock may also be used to advantage in connection with other closure members such as vehicle hoods and luggage compartment lids.

It will be understood that the invention is not to be limited to the exact construction shown and described, but that various changes and modifications may be made without departing from the spirit and scope of the invention, as defined in the appended claims.

What is claimed is:

1. Lock mechanism for securing together two relatively movable members, comprising a rotatable screw threaded element mounted upon one of said members, a nut engageable with said screw threaded element and rotatably mounted upon the other of said members, a pawl normally engaging said nut and preventing rotation of said nut relative to the other of said members, and means associated with said screw threaded element to move said pawl out of holding engagement with said nut to permit rotation of said nut relative to the other of said members.

2. The structure defined by claim 1 which is further characterized in that said nut is formed with a ratchet portion engageable with said pawl to prevent rotation of said nut when said ratchet portion and pawl are in engagement with each other, said screw threaded element being engageable with said pawl after a predetermined closing movement to move said pawl out of engagement with said ratchet portion to permit rotation of said nut relative to said other member.

3. The structure defined by claim 1 which is further characterized in that said nut is mounted upon said other members for limited universal movement to insure alignment between said screw threaded element and said nut, said nut being formed at one end thereof with a ratchet portion engageable with said pawl to normally prevent rotation of said nut relative to said other member, said screw threaded element having a tapered end portion engageable with said universally mounted nut to insure proper alignment of said screw threaded element and said nut, said tapered end portion being engageable with said pawl after a predetermined threaded movement between said element and said nut to move said pawl to a position permitting rotation of said nut relative to said other member in one direction.

4. Lock mechanism for securing together two relatively movable members, comprising a housing secured to one of said members, an element rotatably mounted in said housing and having a threaded portion projecting therebeyond, means for rotating said element, a second housing mounted upon the other of said members, a nut rotatably mounted within said second housing and having a threaded bore formed therein adapted to receive the threaded portion of said element, a movable member carried by said second housing and engageable with said nut to normally hold said nut against rotation relative to said second housing, and means on said element engageable with said last mentioned member to move the latter out of holding engagement with said nut to permit rotation of said nut with said element relative to said second mentioned housing.

5. The structure defined by claim 4 which is further characterized in that said element comprises a hub portion rotatably mounted within said first mentioned housing and having a threaded bore, and a threaded shank received within the threaded bore of said hub portion for axial adjustment relative thereto, said threaded shank having an externally threaded projecting portion engageable with said nut.

6. The structure defined by claim 4 which is further characterized in that said second housing has a spherical socket formed therein, ball bearings between said nut and the spherical socket of said second housing to mount said nut for universal movement therein, and a retainer limiting the universal movement of said nut relative to the axis thereof.

7. The structure defined by claim 4 which is further characterized in that said nut is formed at end thereof with an inclined ratchet tooth and an adjacent groove having side walls of different heights, said last mentioned member comprising a pawl adapted when seated within said groove to prevent rotation of said nut in either direction, said pawl when moveable axially of said nut to a position beyond the low side of said groove permitting rotation of said nut in one direction but preventing rotation of said nut in the opposite direction by reason of interference between said pawl and the high side of said groove.

8. Lock mechanism for securing together a roof member of a motor vehicle body and a header member of said body, comprising a header lock at each side of said header member, each of said header locks having a housing mounted upon one of said members, a generally vertically screw threaded element rotatably mounted within said housing, gearing connected to said element, an electric motor mounted upon said last mentioned member intermediate said header locks, means connecting said motor to the gearing of said header locks to simultaneously rotate the screw threaded elements in each of said locks, each of said header locks having a second housing mounted upon the other of said members, a nut rotatably mounted within said second housing and having a threaded bore adapted to receive the threaded portion of said screw threaded element, cooperating pawl and ratchet means between said second mentioned housing and said nut normally preventing rotation of said nut relative to said housing, and means operated by a predetermined axial movement of said element within said nut to release said pawl and ratchet means and permit rotation of said nut within said second mentioned housing.

9. The structure defined by claim 8 which is further characterized in that said nut is mounted for limited universal movement as well as rotational movement about its axis within said second mentioned housing, a ratchet portion formed at the end of said nut remote from the end first entered by said screw threaded element, a pawl supported upon said second mentioned housing and engageable with said ratchet portion of said nut to normally prevent rotation of said nut relative to said second mentioned housing, said screw threaded element having an end portion engageable with said pawl after a predetermined threaded engagement between said element and said nut to move said pawl to a position permitting rotation of said nut within said second mentioned housing, said ratchet portion of said nut having a portion engageable with said pawl in the opposite direction of rotation of said nut to hold said nut against rotation relative to said second mentioned housing when said screw threaded element is rotated in the reverse direction.

No references cited.